United States Patent
Sawada et al.

(10) Patent No.: US 6,286,914 B1
(45) Date of Patent: Sep. 11, 2001

(54) AUTOMOTIVE BRAKE FLUID PRESSURE CONTROL APPARATUS

(75) Inventors: Mamoru Sawada, Yokkaichi; Kouji Okazaki, Anjou, both of (JP)

(73) Assignee: Nippondenso Co., Ltd., Kariya (JP)

( * ) Notice: Subject to any disclaimer, the term of this patent is extended or adjusted under 35 U.S.C. 154(b) by 812 days.

(21) Appl. No.: 08/512,396

(22) Filed: Aug. 8, 1995

(30) Foreign Application Priority Data

Aug. 8, 1994 (JP) .................................................. 6-185965

(51) Int. Cl.$^7$ ...................................................... B60T 8/34
(52) U.S. Cl. ........................... 303/113.2; 303/116.1; 701/71; 701/83
(58) Field of Search ..................... 303/113.2, 113.4, 303/116.1, 116.2, 119.1; 364/426.01–426.03; 701/71, 78, 83

(56) References Cited

U.S. PATENT DOCUMENTS

| | | | |
|---|---|---|---|
| 5,072,995 | * 12/1991 | Kawamura et al. | 303/113.2 X |
| 5,188,437 | * 2/1993 | Willmann | 303/113.2 |
| 5,324,103 | 6/1994 | Iwata | 303/113.2 |
| 5,324,105 | 6/1994 | Iwata | 303/113.2 |

FOREIGN PATENT DOCUMENTS

| | | | |
|---|---|---|---|
| 4118719 | * 12/1992 | (DE) | 303/113.2 |
| 482379 | * 4/1992 | (EP) | 303/113.2 |
| 2257214 | * 1/1993 | (GB) | 303/113.2 |

* cited by examiner

Primary Examiner—Robert J. Oberleitner
(74) Attorney, Agent, or Firm—Pillsbury Winthrop LLP

(57) ABSTRACT

When it has been determined that a termination condition of brake TRC control has been fulfilled, SM valves 50FL and 50FR and a motor 80 are continuously placed in an ON state, and along with this, SR valves 70FL and 70FR are switched off, and furthermore holding valves 46FL and 46FR and pressure-reducing valves 48FL and 48FR of driving wheels are changed from an on-off switching state to an ON state, and termination control is initiated. Because of this, high-pressure brake fluid on the wheel-cylinder 2FL and 2FR side is expelled via the pressure-reducing valves 48FL and 48FR by drive of the motor 80. Consequently, high-pressure brake fluid can rapidly be expelled immediately after brake TRC control, and along with this, oil-shock noise can be alleviated.

9 Claims, 12 Drawing Sheets

AUTOMOTIVE BRAKE FLUID PRESSURE CONTROL APPARATUS

CROSS REFERENCE TO RELATED APPLICATION

This application is based upon and claims priority from Japanese Patent Application No. Hei. 6-112729 filed Aug. 8, 1994, the contents of which are incorporated herein by reference.

BACKGROUND OF THE INVENTION

1. Field of the Invention

The present invention relates to an automotive brake-fluid pressure control apparatus employed for example in traction control during acceleration slippage.

2. Description of the Related Art

Conventionally, hydraulic circuits of various types of structure have been proposed as an automotive brake-fluid pressure control apparatus employed for example in traction control during acceleration slippage; in recent years in particular, as shown in for example FIG. 13, a hydraulic circuit has been considered which can realize antiskid control and traction control and so on, and which has a structure driving two hydraulic pumps P1 and P2 with one hydraulic motor MR.

This hydraulic circuit performs traction control on a vehicle of front-wheel drive (FF) of a front-mounted engine, and valves and the like to perform traction control are disposed in a conduit of brake fluid reaching from a master cylinder M/C to wheel cylinders W/C of left and right front wheels FL and FR. Specifically, these are a master-cylinder cutoff valve (SM valve) which cuts off brake fluid from the master cylinder M/C, a reservoir cutoff valve (SR valve) which cuts off communication from a reservoir R on the M/C side to the intake side of the hydraulic pumps P1 and P2, and also electromagnetic-type valves V1 and V2 which perform holding and release of high brake-fluid pressure given to a wheel cylinder W/C.

Accordingly, in a case of executing traction control with this hydraulic circuit (hereinafter described with reference to the FL wheel), braking force was controlled with holding and release of brake-fluid pressure performed by valves V1 and V2 in a state where the conduit had been interrupted by the SM valve. Additionally, normal brake operation corresponding to depression of a brake pedal BP by a driver was made possible after termination of traction control by causing the hydraulic pump P1 to be stopped along with switching to a state wherein the SM valve was communicated, the valve V1 was communicated, and the valve V2 was interrupted.

However, problems such as described hereinafter existed in a case where the respective valves and the like are established in the above-described manner so that normal braking operation can be operated after termination of traction control.

That is to say, high-pressure brake fluid used in traction control must be expelled when the SM valve and the valves V1 and V2 are switched so as to enable normal braking operation after termination of traction control. However, there existed the problem in that time is required to expel the brake fluid, and setup for normal braking operation is delayed. If the SM valve and the valves V1 and V2 are switched in a state where this high-pressure brake fluid is not expelled, high pressure is applied to the master cylinder M/C at the time of normal braking operation, and there exists a possibility of damaging the master cylinder M/C.

Additionally, in a case where the SM valve and the valves V1 and V2 are switched to release the high-pressure brake fluid to the low-pressure side in the foregoing manner after termination of traction control, the hydraulic-pressure differential of the low-pressure side and high-pressure side is large, and so oil-shock noise was generated particularly on the master-cylinder side which has small capacity, and there was considerably unpleasantness for the driver.

SUMMARY OF THE INVENTION

To solve the above-described problems, it is an object of the present invention to provide an automotive brake-fluid pressure control apparatus which can quickly expel high-pressure brake fluid immediately after brake-force control such as traction control and which also can alleviate oil-shock noise.

An automotive brake-fluid pressure control apparatus according to the present invention causes a pump to be operated together with placing a first switching valve at an interrupted position and placing a second switching valve at a communicated position by a termination-control device as well as driving a pressure-control valve to a state which causes brake fluid to be expelled from a wheel cylinder at a time of termination of control of motion characteristics of a vehicle such as traction control or the like.

That is to say, valves are switched at a time of termination of traction control or the like so that braking operation by a driver becomes possible. At this time, according to the present invention, a pump is not caused to stop as in the prior art but conversely causes a pump to operate to expel brake fluid from a hydraulic circuit on a wheel-cylinder side, and so high-pressure brake fluid is rapidly expelled and hydraulic pressure can be reduced. As a result thereof, damage to the master cylinder can be prevented. Additionally, generation of oil-shock noise at a time of termination of traction control or the like can be alleviated by this rapid reduction of hydraulic pressure.

Additionally, in a case where acceleration slippage is detected by an acceleration-slippage detection device, it is also acceptable to apply brake-fluid pressure to the wheel cylinder of the vehicle wheel by brake-fluid pressure application device. In this case, acceleration slippage can accurately be prevented.

Furthermore, it is also acceptable to drive a termination-control device at a time of termination of traction control in an apparatus which performs antiskid control (ABS control) and traction control (TRC control).

That is to say, a motor is normally driven by a relay, but delays are established at ON-→OFF and OFF-→ON in a case of a mechanical relay to prevent contact-point melting. For this reason, there is a delay when the relay is switched off at a time of termination of TRC control until the relay subsequently is switched on. For this reason, in a case during TRC control when ABS control is started (with TRC control being stopped), there exists a problem wherein start timing of the ABS control is delayed. Consequently, according to the present invention, the motor is continued to be caused to operate even with the timing whereby this relay is switched off in a case where ABS control is started. Because of this, there exists an advantage whereby a pressure-reduction delay due to ABS control does not occur. That is to say, when a termination-control device is driven at a time of termination of traction control, not only are damage due to high hydraulic pressure prevented and oil-shock noise alleviated, but ABS control as well can be executed favorably.

Moreover, a method identical to a normal pressure-reducing method in ABS control can be employed to the foregoing termination-control device.

Furthermore, when pressure of brake fluid discharged by a pump has exceeded a predetermined pressure, it is preferred that brake fluid be expelled to a master-cylinder side by a pressure-regulating valve. Through this, brake-fluid pressure can be maintained in a safe uniform range.

Additionally, a valve to expel brake fluid from a discharge side of the pump to the reservoir of the master cylinder and a valve to expel brake fluid from the discharge side of the pump to the conduit connected to the master cylinder can be employed as the pressure-regulating valve.

In addition, a device to take in brake fluid from the reservoir of the master cylinder and a device to take in brake fluid from the reservoir of the master cylinder via the master cylinder can be employed as the pump.

In a case where it has been determined by a braking-determination device that a driver has performed braking, it is preferred that control by the above-described termination-control device be stopped, the pump be caused to be stopped by the braking-control device, and along with this, the first switching valve be placed at an interrupted position and second switching valve be placed at a communicated position, and moreover the pressure-control valve be driven to a state to supply brake fluid to the wheel cylinder. Moreover, the communicated position of the second switching valve herein includes a position whereat the pressure-regulating valve is set to open at a predetermined pressure even when the second switching valve is interrupted.

That is to say, when control is performed by the above-described termination-control device, expelling operation for high-pressure brake fluid by the termination-control device is rapidly stopped to cause priority to be given to braking operation by the driver in a case where braking operation has been performed by the driver. Through this, normal braking operation becomes possible.

In a case where it has been determined by a braking-termination determination device that braking operation by a driver has been terminated, it is preferred that the first switching valve be driven to a communicated state for a predetermined interval by an expulsion-control device and brake fluid be expelled from the reservoir on the wheel-cylinder side.

That is to say, in a case where braking operation by a driver has been terminated, operation to further expel brake fluid which became high in pressure in the previous traction control or the like is performed for a predetermined interval. Through this, residual hydraulic pressure can favorably be reduced.

In a case where it has been determined by the braking-termination determination device that braking operation by a driver has been terminated, it is acceptable that a pressure-control valve disposed in a conduit connected from the master-cylinder side to the reservoir on the wheel-cylinder side, is driven by the expulsion-control device to a communicated state for a predetermined interval, expelling brake fluid from the reservoir on the wheel-cylinder side.

An effect similar to that described above can be obtained through this as well, and employment in a hydraulic circuit of an FF vehicle (front-mounted engine, front-wheel drive) in particular is favorable.

It is also acceptable to drive a switching device and cause a supply of high-pressure brake fluid from a high-pressure supply device to be stopped by the termination-control device, together with driving a pressure-increasing control valve to a state where brake fluid is suppliable, and moreover driving a pressure-reducing control valve to a state where brake fluid is expellable, in at least a synchronized period of a time of termination of control of motion characteristics of a vehicle.

That is to say, a high-pressure supply device of, for example, a pump or the like is caused to stop immediately after traction control or the like, as in the prior art, and the hydraulic circuit is opened and placed in a state to expel brake fluid. Through this, hydraulic pressure is caused to drop rapidly, and moreover oil-shock noise can be reduced.

Furthermore, a pump or accumulator can be employed as the foregoing high-pressure supply device. Additionally, in a case of a pump, switching of discharge and stoppage by a motor relay and switching by supply and stoppage of brake fluid on an intake side of the pump can be employed as the switching device; in a case of an accumulator, switching by a solenoid can be employed.

The termination-control device can prevent application of high pressure to the master-cylinder side by driving the second switching valve to an interrupted position in addition to driving the pressure-increasing control valve and pressure-reducing control valve. Herein, the interrupted position is a position where the passage is completely closed, and the above drive-manner can be employed in a hydraulic circuit where a pump performs self-suction from a reservoir of the master-cylinder and returns the brake fluid to the reservoir in for example FR vehicle (front-mounted engine, rear-wheel drive).

At a time of termination of control of motion characteristics of a vehicle, it is acceptable to stop a supply of high-pressure brake fluid from the high-pressure supply device by the termination-control device, together with switching between two modes, i.e., a communicating mode to drive the pressure-increasing valve to a state where brake fluid is suppliable and drive the pressure-reducing valve to a state where brake fluid is expellable, and a pressure-reducing mode to drive the pressure-increasing valve to a state where brake fluid is not suppliable and drive the pressure-reducing valve to a state where brake fluid is not expellable.

That is to say, by switching the two modes by, for example, duty control, a state where high-pressure brake fluid is allowed to escape with appropriate timing can be established, and rapidness of brake fluid can favorably reduce expulsion and oil-shock noise.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings.

DETAILED DESCRIPTION OF THE PREFERRED EMBODIMENTS

Embodiments according to the present invention will be described hereinafter with reference to the drawings.
(First embodiment)

Figure 1:
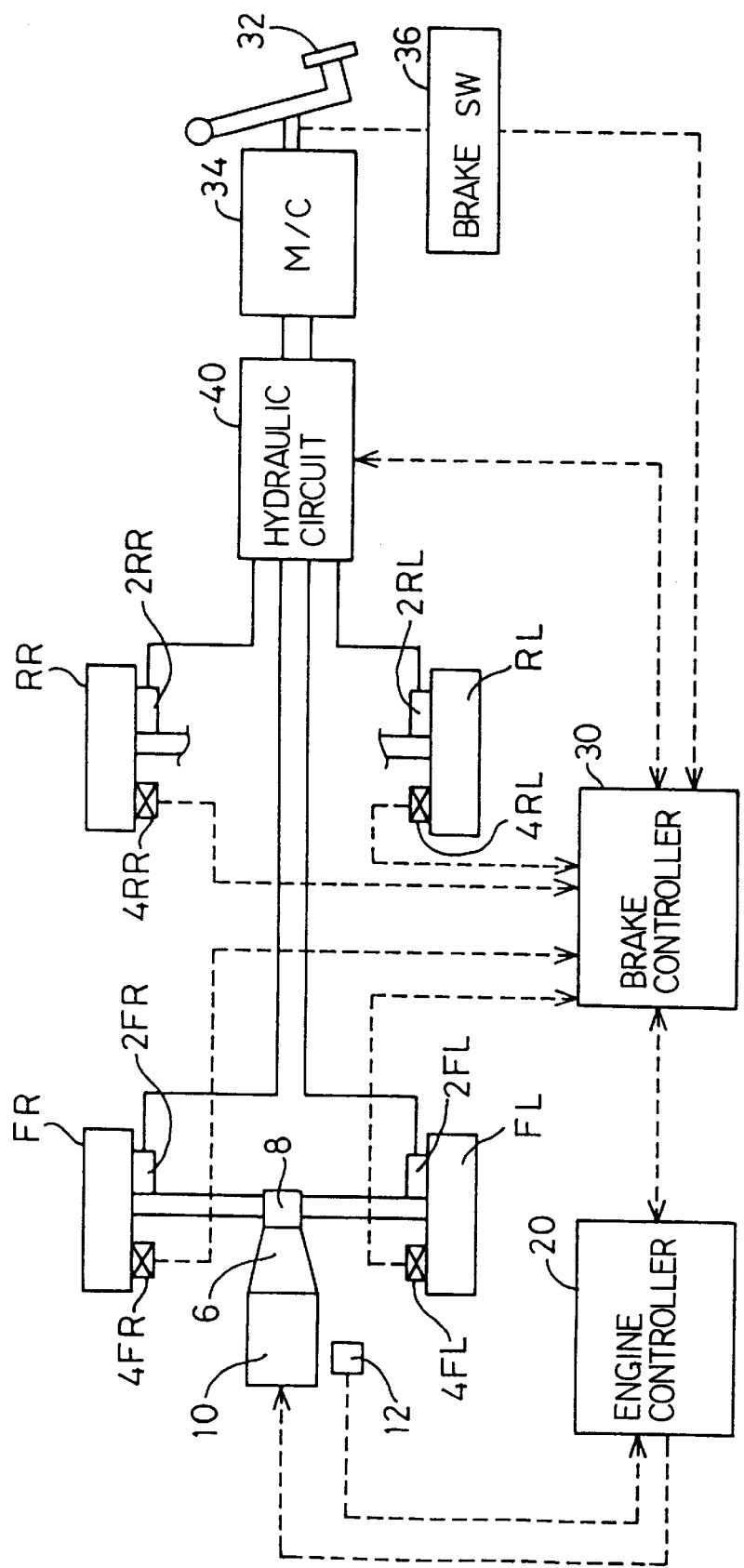
FIG. 1 is a schematic structural view indicating an overall structure of a vehicle control system according to a first embodiment.

Firstly, FIG. 1 is a schematic structural view indicating an overall structure of a control system of a vehicle in which the present invention is applied. The present embodiment applies the present invention in a front-engine, front-drive (FF) four-wheel vehicle, and uses a circuit of a master self-suction and master return form as a hydraulic circuit.

As shown in FIG. 1, the several wheels (front left wheel FL, front right wheel FR, rear left wheel RL, and rear right wheel RR) of the vehicle are respectively provided with wheel cylinders 2FL, 2FR, 2RL, and 2RR to apply braking force to the several wheels FL to RR, as well as with speed sensors 4FL, 4FR, 4RL, 4RR to detect rotating speed of the several wheels. Additionally, the left and right front wheels which are the driving wheels (hereinafter termed simply "driving wheels") FL and FR receive drive force from an internal combustion engine 10 connected via a gearbox 6 and differential gear 8, and rotate. This internal combustion engine 10 which becomes the power source is provided with a sensor array 12 to detect a running state of rotating speed, amount of intake air, coolant-water temperature, degree of opening of a throttle valve (throttle degree of opening), and the like. Accordingly, detected signals from this sensor array 12 are input to an engine controller 20, and the engine controller 20 is used to control the amount of fuel injection and ignition timing of the internal combustion engine 10 on the basis of the detected signals.

Additionally, detected signals from the speed sensors 4FL to 4RR disposed on the several wheels FL to RR are input to a brake controller 30. By controlling several electromagnetic valves within a hydraulic circuit 40 provided in a hydraulic path extending from a master cylinder (hereinafter termed "M/C") 34 to discharge brake fluid according to depression of a brake pedal 32 to the wheel cylinders (hereinafter termed "W/Cs") 2FL to 2RR of the several wheels FL to RR, the brake controller 30 executes antiskid control (hereinafter termed "ABS control") and traction control (hereinafter termed "TRC control") to suppress slippage occurring in the wheels during vehicle braking and vehicle acceleration. Other than detected signals from the above-described several speed sensors 4FL to 4FR, the brake controller 30 receives and operates according to detected signals from a brake switch hereinafter termed "brake SW") which assumes an ON state when the brake pedal 32 is operated, a pressure sensor not illustrated which detects hydraulic pressure within the W/Cs 2FL and 2FR of the driving wheels FL and FR, and so on.

The engine controller 20 and brake controller 30 are respectively composed of a microcomputer structured primarily of a CPU, ROM, RAM, and the like, and these controllers 20 and 30 are provided with communication devices to transmit and receive detection data from sensors, control data, and so on.

The hydraulic circuit 40 will be described next.

Figure 2:
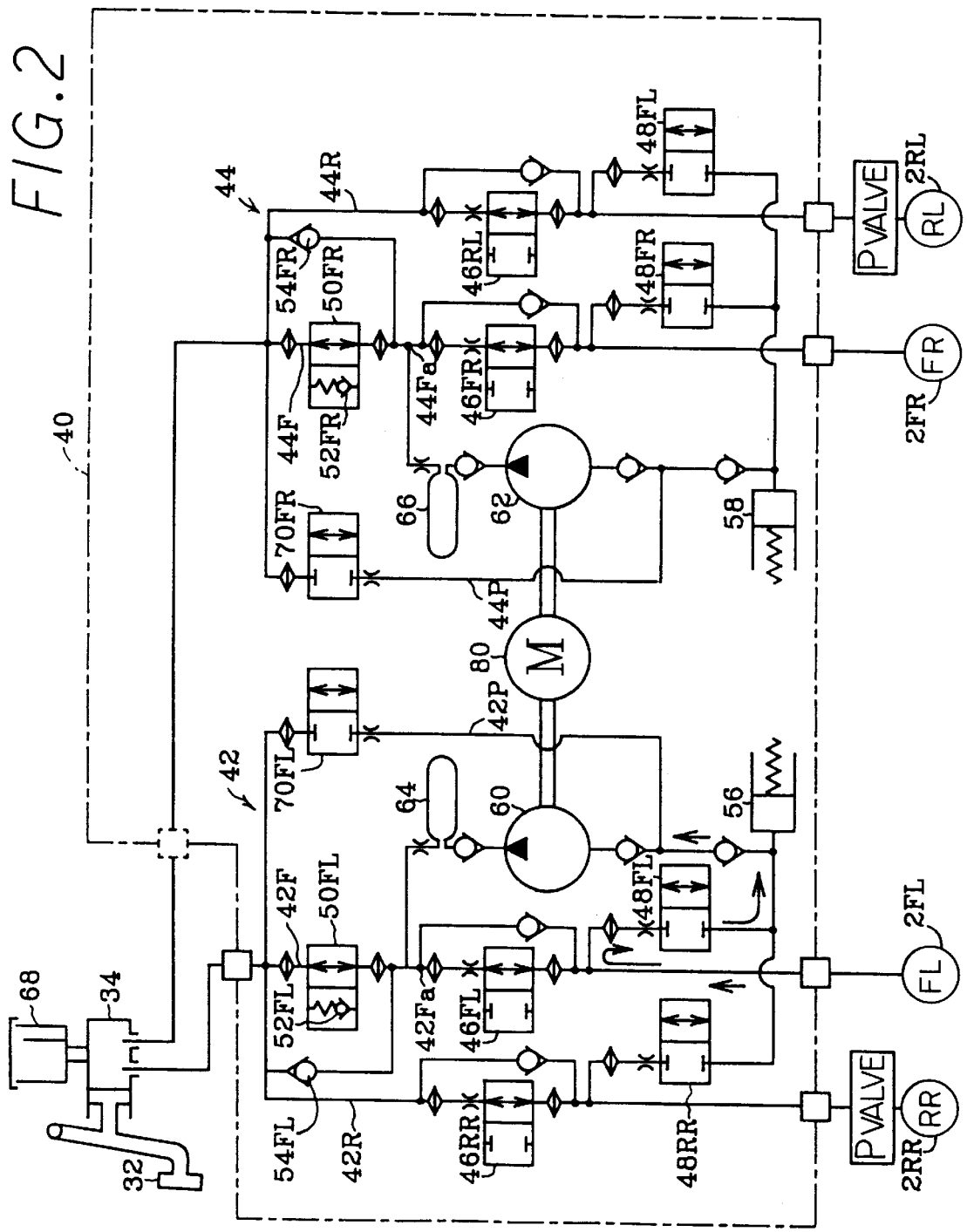
FIG. 2 is an explanatory view indicating a structure of a hydraulic circuit according to the first embodiment.

As shown in FIG. 2, the hydraulic circuit 40 is provided with dual-system hydraulic paths 42 and 44 to supply brake fluid sent under pressure from two oil paths of the M/C 34 to the front-left wheel FL and rear-right wheel RR and to the front-right wheel FR and rear-left wheel RL, respectively. Accordingly, of these hydraulic paths 44 and 42, provided in the hydraulic paths 44R and 42R reaching the W/Cs 2RL and 2RR of the left and right rear wheels which are driven wheels (hereinafter termed simply "driven wheels") RL and RR are holding valves (pressure-increasing control valves) 46RL and 46RR which are switchable to a pressure-increasing position to be communicated with the paths 44R and 42R and to a holding position to interrupt the paths 44R and 42R as well as pressure-reducing valves (pressure-reducing control valves) 48RL and 48RR to expel brake fluid within the respective W/Cs 2RL and 2RR.

Moreover, the holding valves 46RL and 46RR normally assume a pressure-increasing position, and are switched to a holding position by electrical conduction from the brake controller 30. Additionally, the pressure-reducing valves 48RL and 48RR normally assume an interrupted state, and are switched to a communicated state to expel brake fluid within the W/Cs 2RL and 2RR by electrical conduction from the brake controller 30.

Meanwhile, of the foregoing respective hydraulic paths 42 and 44, holding valves 46FL and 46FR and pressure-reducing valves 48FL and 48FR are provided as the above-described control valves in the hydraulic paths 42F and 44F reaching the WICs 2FL and 2FR of the left and right front wheels FL and FR which are the driving wheels, similarly to the hydraulic paths 44R and 42R of the driven wheel side. Master-cylinder cut off valves (SM valves) 50FL and 50FR are disposed at the M/C 34 side of the respective holding valves 46FL and 46FR as the above-described switching valves to communicate and interrupt the paths 42F and 44F.

An interrupted position of these SM valves 50FL and 50FR is a position where relief valve 52FL and 52FR therein is communicated when hydraulic pressure of the holding valve 46FL and 46FR side has become an upper-limit value or more which is larger than hydraulic pressure of the M/C 34 side by a predetermined value, and the relief valve 52FL and 52FR limits hydraulic pressure of the holding valve 46FL and 46FR to the upper-limit value or less.

Accordingly, relief valves 54FL and 54FR which are communicated when hydraulic pressure of the M/C 34 side has become larger than hydraulic pressure of the holding valve 46FL and 46FR side and which supply pressurized fluid output from the M/C 34 to the holding valve 46FL and 46FR side, are connected in parallel with these SM valves 50FL and 50FR. The SM valves 50FL and 50FR normally assume a communicated state, and are switched to an interrupted state by electrical conduction from the brake controller 30.

Additionally, pressure-reducing valves 48FR and 48RL and reservoirs 56 and 58 which temporarily accumulate brake fluid expelled from the pressure-reducing valves 48FL and 48RR are provided in the hydraulic paths 42 and 44, and hydraulic pumps 60 and 62 which pressurize and send the brake fluid thereof to a hydraulic path 42Fa between the SM valve 50FL and holding valve 46FL and to a hydraulic path 44Fa between the SM valve 50FR and holding valve 46FR, respectively, are also provided. Accumulators 64 and 66 to suppress internal hydraulic pulsation are disposed in discharge paths of brake fluid from the respective hydraulic pumps 60 and 62.

Furthermore, supply paths 42P and 44P to supply brake fluid directly to the hydraulic pumps 60 and 62 from a reservoir 68 provided in an upper portion of the M/C 34 via the M/C 34 during execution of brake TRC control which will be described later, are provided in the respective hydraulic paths 42 and 44; provided in these supply paths 42P and 44P are reservoir cutoff valves (SR valves) 70FL and 70FR to communicate and interrupt the paths thereof.

The SR valves 70FL and 70FR normally assume an interrupted state, and are switched to a communicated state by electrical conduction from the brake controller 30. In addition, the respective hydraulic pumps 60 and 62 are driven via a motor 80 during execution of the brake TRC control.

Accordingly, when slippage occurs in the respective wheels FL to RR during vehicle braking, the above-described brake controller 30 controls brake-fluid pressure within the respective W/Cs 2FL to 2RR in correspondence with a slippage state of the respective wheels FL to RR by initiating ABS control and switching the holding valves 46FL to 46RR and pressure-reducing valves 48FL to 48RR in the above-described hydraulic path 40 on or off (conduction or nonconduction).

Additionally, when slippage occurs in the driving wheels FL and FR during vehicle acceleration, the engine controller 20 initiates engine TRC control to suppress output torque of the internal combustion engine 10 by reducing the amount of fuel injection or outputting a delay-angle instruction for ignition timing, and along with this, initiates brake TRC control which will be described later, switches the SM valves 50FL and 50FR and SR valves 70FL and 70FR in the foregoing hydraulic circuit 40 on (conduction), and switches the holding valves 46FL and 46FR and pressure-reducing valves 48FL and 48FR on or off, thereby applying braking force to the driving wheels FL and FR and suppressing slippage.

Brake TRC control, which among the ABS control, engine TRC control, and brake TRC control executed in this way by the brake controller 30 is the primary processing according to the present invention, will be described in detail hereinafter with reference to the flowchart shown in FIG. 3 and the flowchart shown in FIG. 4.

Figure 3:
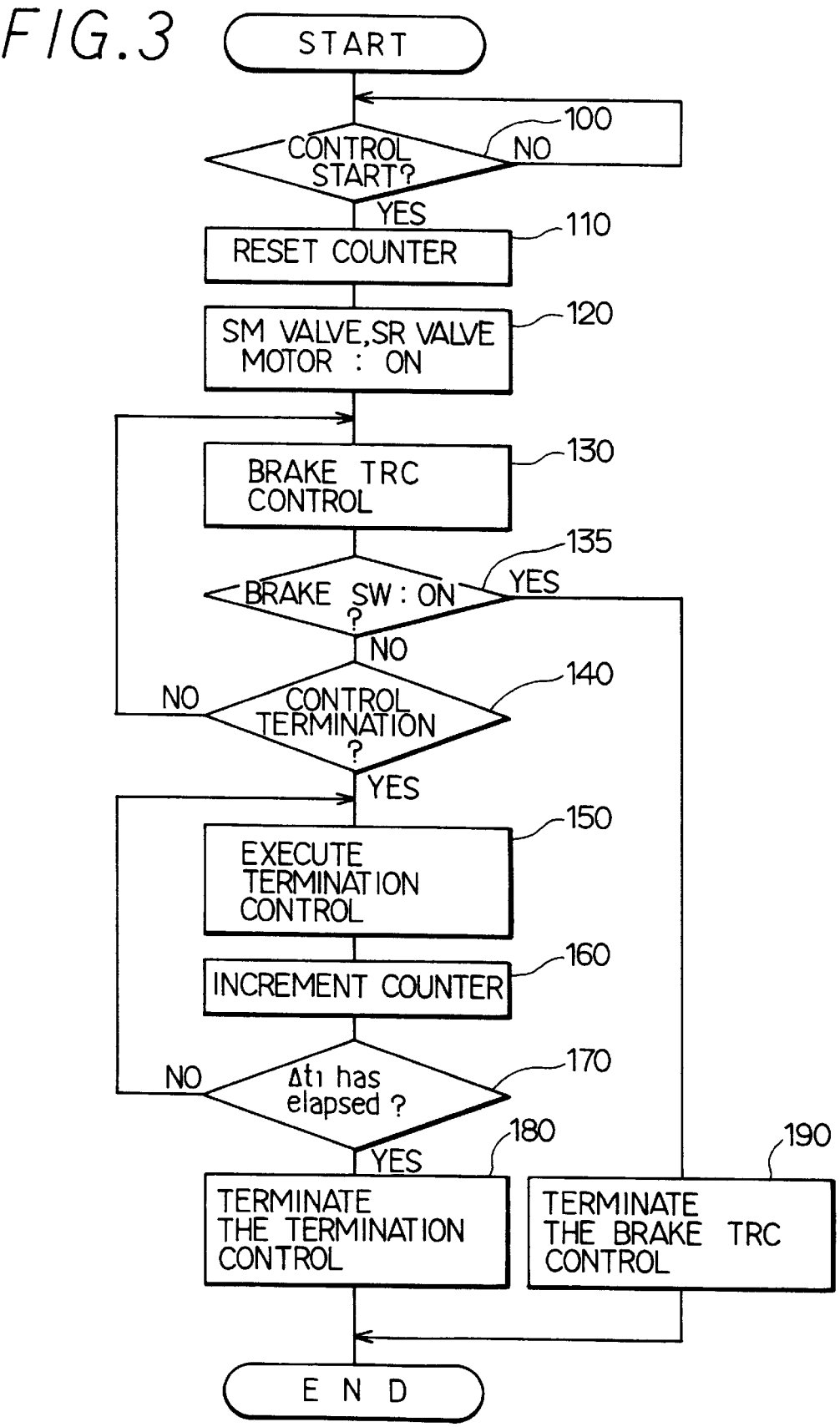
FIG. 3 is a flowchart indicating processing of termination control according to the first embodiment.
Figure 4:
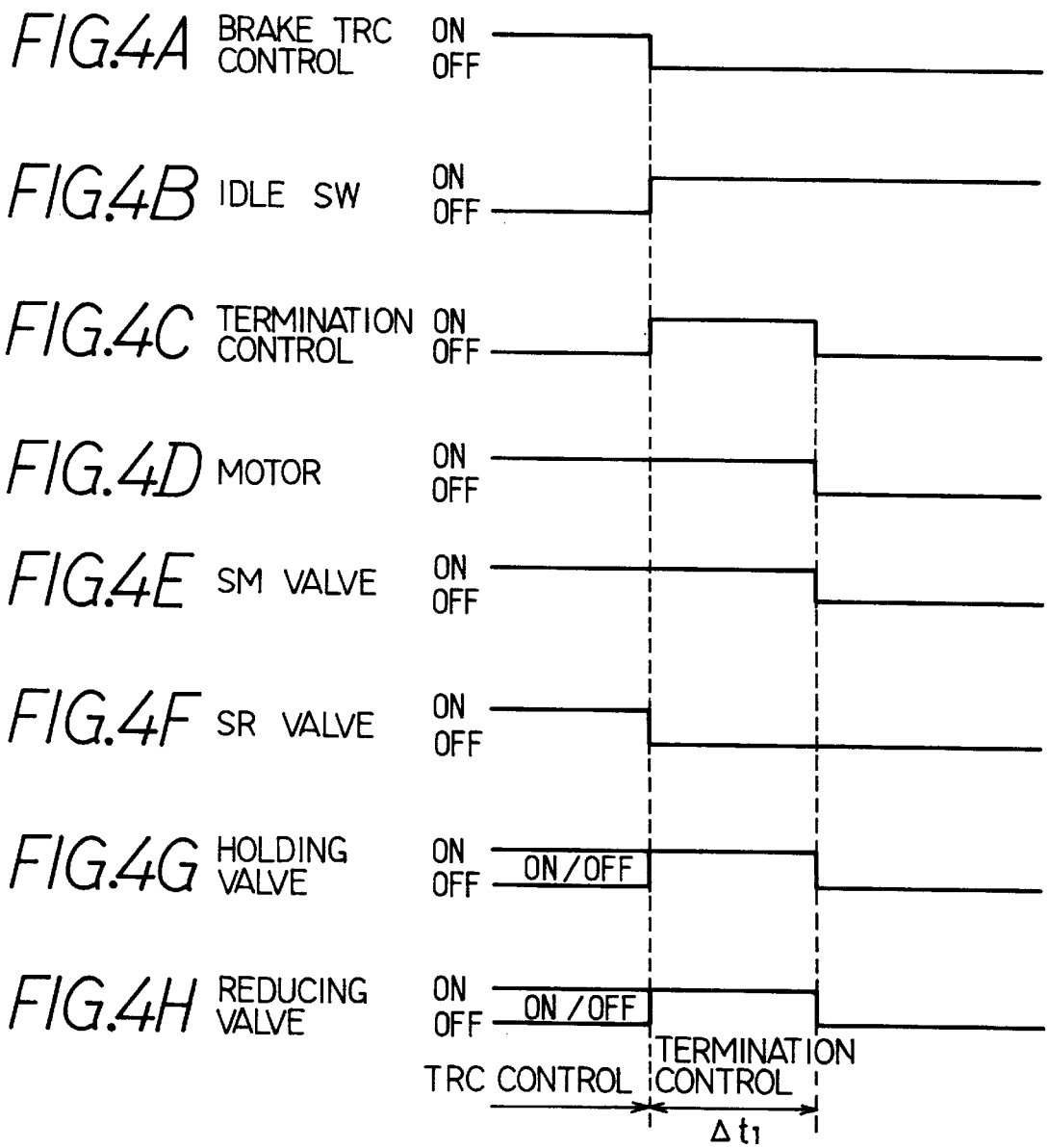
FIGS. 4A through 4H are timing charts indicating processing of termination control according to the first embodiment.

As shown in FIG. 3, firstly control-initiation determination is performed in step 100 during vehicle acceleration to determine a predetermined condition such as whether the driving wheels FL and FR have reached a slippage state where the brake TRC control should be performed. Accordingly, if no need exists to initiate brake TRC control, fulfillment of the initiation condition for brake TRC control is awaited by repeatedly executing the processing of this step 100, and when the initiation condition for brake TRC control is fulfilled, the processing progresses to the subsequent step 110.

In step 110, a counter used in termination control which will be described later is reset.

In the subsequent step 120, the SM valves 50FL and 50FR, SR valves 70FL and 70FR, and motor 80 are switched on, and the hydraulic circuit 40 is placed in a state where the driving wheels FL and FR can be braked by brake fluid discharged from the hydraulic pumps 60 and 62.

Accordingly, in the subsequent step 130, known brake TRC control is initiated to control brake-fluid pressure within the W/Cs 2FL and 2FR and in turn braking force applied to the driving wheels FL and FR by controlling the on-off state of the holding valves 46FL and 46FR and pressure-reducing valves 48FL and 48FR in response to the slippage state of the driving wheels FL and FR.

That is to say, in step 130, brake-fluid pressure within the W/Cs 2FL and 2FR and in turn braking force applied to the drive wheels FL and FR is controlled by switching a control mode of the holding valves 46FL and 46FR and pressure-reducing valves 48FL and 48FR to a pressure-increasing mode which switches off both the holding valves 46FL and 46FR and the pressure-reducing valves 48FL and 48FR and increases brake-fluid pressure within the W/Cs 2FL and 2FR, to a holding mode which switches on only the holding valves 46FL and 46FR and maintains brake-fluid pressure within the W/Cs 2FL and 2FR, or to a pressure-reducing mode which switches on both the holding valves 46FL and 46FR and the pressure-reducing valves 48FL and 48FR and reduces brake-fluid pressure within the W/Cs 2FL and 2FR, in response to the slippage state of the driving wheels FL and FR.

When brake TRC control is initiated in this way, then in step 135 it is determined whether the brake pedal 32 has been depressed and the brake SW 36 has been switched on. If an affirmative determination is made herein, processing to terminate brake TRC control is performed in step 190 and the present processing is stopped once in order to perform normal braking operation. In specific terms, the SM valves 50FL and 50FR, SR valves 70FL and 70FR, motor 80, and holding valves 46FL and 46FR and pressure-reducing valves 48FL and 48FR of the driving wheels FL and FR are all switched off.

Meanwhile, if a negative determination is made in the foregoing step 135, processing advances to step 140 and it is determined whether the termination condition for brake TRC control has been fulfilled. This determination can, for example, make determination according to whether a throttle degree of opening detected on the engine-controller 20 side has become zero, whether an idle SW not illustrated has been switched on, and so on.

Accordingly, if it is determined in the foregoing step 140 that the termination condition for brake TRC control has been fulfilled, processing is transferred to step 150 and termination control is performed as shown in FIGS. 4A through 4H. That is to say, among the SM valves 50FL and 50FR, SR valves 70FL and 70FR, and motor 80 switched on in step 120 at the time of initiation of brake TRC control, the SM valves 50FL and 50FR and motor 80 continue to remain in an ON state, the SR valves 70FL and 70FR are switched off, and moreover the holding valves 46FL and 46FR and pressure-reducing valves 48FL and 48FR of the driving wheels are changed from an on-off switching (control) state to an ON state, and termination control is initiated. Because of this, high-pressure brake fluid on the W/Cs 2FL and 2FR side is expelled via the pressure-reducing valves 48FL and 48FR by drive of the motor 80.

In the subsequent step 160, elapsed time since initiation of termination control is measured by incrementing a counter.

In the subsequent step 170, it is determined according to the counter whether a predetermined time Δt1 has elapsed since initiation of termination control. In a case where the predetermined time Δt1 has elapsed, processing to cause to terminate the foregoing termination control is performed in step 180. That is to say, the SM valves 50FL and 50FR, SR valves 70FL and 70FR, motor 80, and holding valves 46FL and 46FR and pressure-reducing valves 48FL and 48FR of the driving wheels FL and FR are all switched off, and operation is terminated once.

In this way, according to the present embodiment, in a case where the brake TRC control has terminated, the SM valves are maintained in an ON state for a predetermined interval, and along with this, the holding valves 46FL and 46FR and pressure-reducing valves 48FL and 48FR are respectively switched on for a predetermined interval to establish a reduced-pressure state, and the motor 80 is driven for the predetermined interval in this state. Because of this, high-pressure brake fluid follows the path of the arrows in FIG. 2 and is expelled from the W/Cs 2FL and 2FR side via the pressure-reducing valves 48FL and 48FR, and so there exists a significant effect in which hydraulic pressure can rapidly be reduced. Due to this, a state to perform braking operation by normal depression of the brake pedal 32 can quickly be established.

Additionally, because reduction of brake-fluid pressure can rapidly be performed, there also exists an advantage in that oil-shock noise which occurs immediately after brake TRC control can be alleviated.

Furthermore, a FF vehicle was taken as an example according to the present embodiment, but the above-described termination control is also applicable in an FR vehicle which will be described later, wherein only the driving wheels and the driven wheels differ.

A case where ABS control is initiated during brake TRC control will be described hereinafter with reference to FIG. 5. A case where it has been determined that deceleration slippage has occurred due, for example, to braking operation by a driver while the vehicle is traveling at low speed, a broken wire in the brake SW 36, or the like may be considered as a case where ABS control is initiated during brake TRC control.

Figure 5:
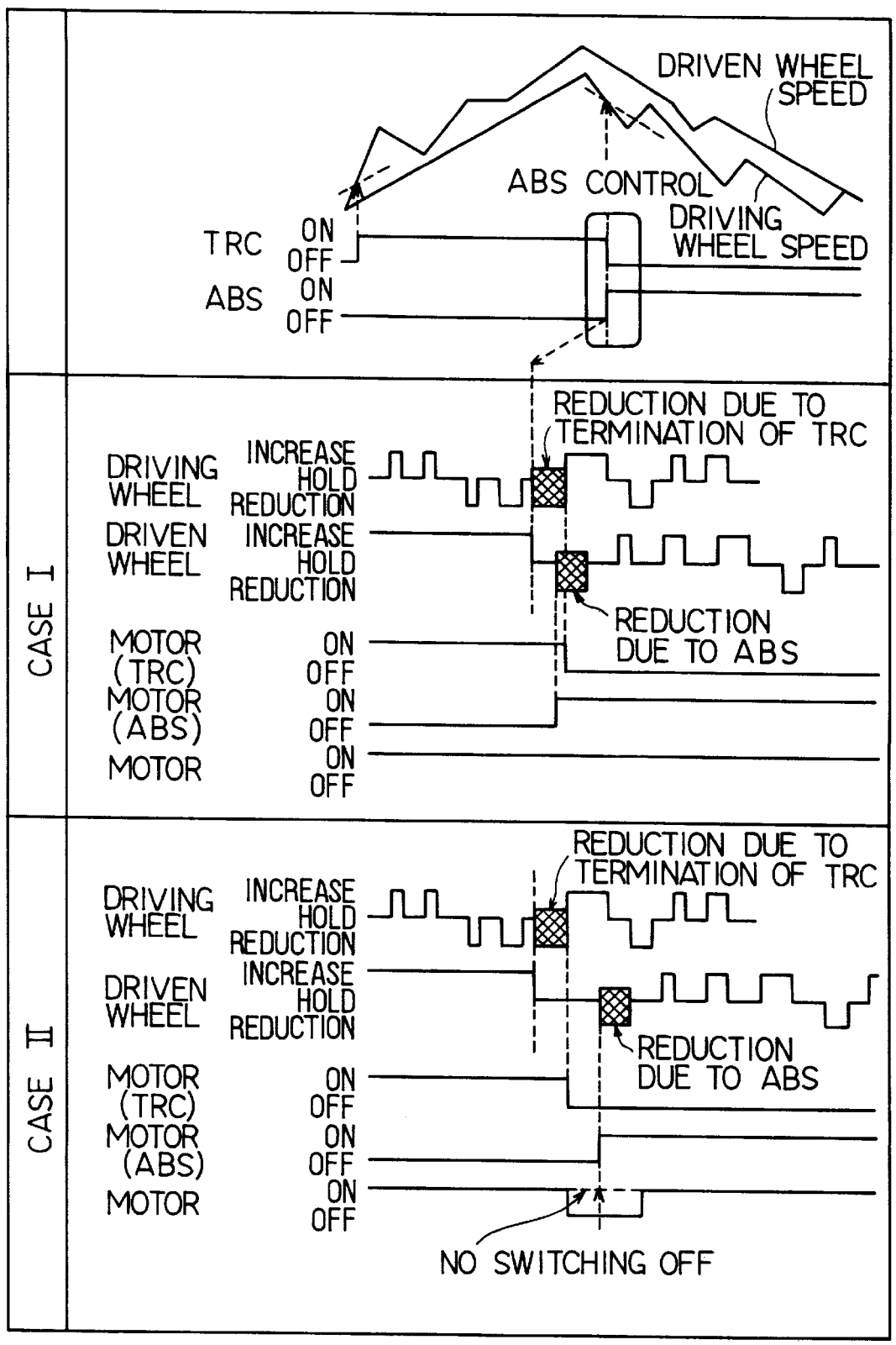
FIG. 5 is an explanatory view indicating a case of performance of ABS control immediately after TRC control.

As shown in FIG. 5, when ABS control is initiated during brake TRC control due to some cause, normal brake TRC control is stopped and ABS control is initiated.

According to the present embodiment, as shown in case I of FIG. 5, the above-described termination control involving drive of the motor 80 and the like is performed for a predetermined interval immediately after stoppage (termination) of normal brake TRC control. Consequently, in a case where a request for motor 80:ON due to pressure reduction for ABS control is made during the interval in which the motor 80 is switched on in this termination control, the motor 80 comes to be driven continuously, and so there is no delay in initiation of pressure reduction for ABS control even in a case where a delay has been established for a mechanical relay of the motor 80.

However, as shown in case II of FIG. 5, in a case where a request for motor 80:ON due to pressure reduction for ABS control is made after termination of the foregoing termination control, the motor 80 has already been switched off once, and so the switching-on of the motor 80 is delayed by a predetermined interval (for example 200 ms) because of the delay of the mechanical relay. Consequently, it is preferred that a method to switch on the motor 80 in continuation after the foregoing termination control be employed in order to solve this problem.

According to the present embodiment, termination control such as the foregoing is performed after termination of normal brake TRC control, and moreover this termination control plays a role which is similar to control of pressure reduction for ABS control, and so an effect is demonstrated in which operation of pressure reduction in ABS control can be performed rapidly even in a case where ABS control may hypothetically be initiated during brake TRC control.

(Second embodiment)

A second embodiment of an automotive brake fluid pressure control apparatus will be described hereinafter.

The present embodiment is applied to an FF vehicle having a hydraulic circuit similar to the foregoing first embodiment, and so a description of hardware structure thereof will be omitted, and control which is an essential portion of the present embodiment will be described.

Figure 6:
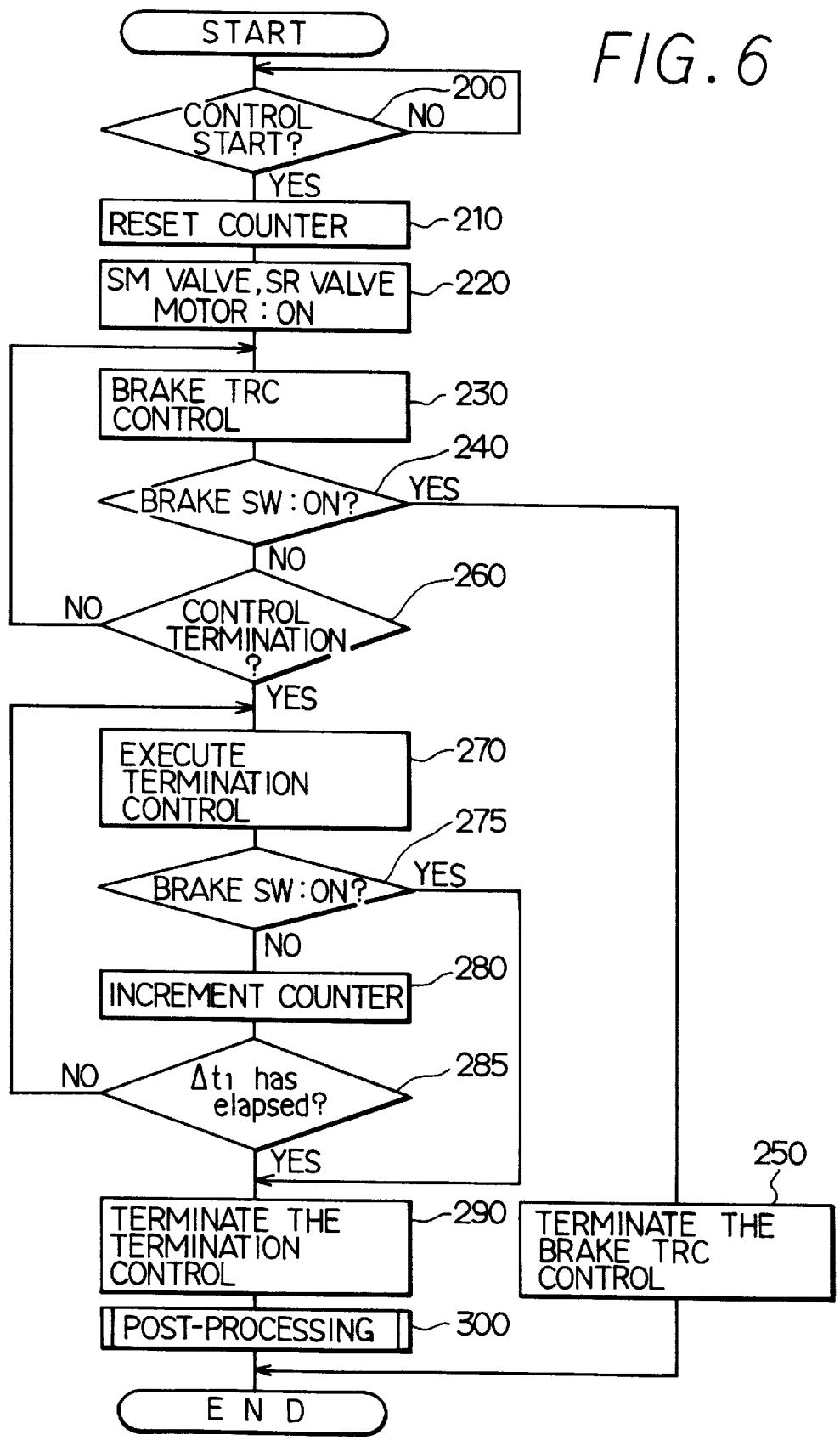
FIG. 6 is a flowchart indicating processing of termination control according to a second embodiment.

In brake TRC control processing according to the present embodiment, as shown in FIG. 6, firstly control-initiation determination is performed in step 200 during vehicle acceleration to determine a predetermined condition such as whether the driving wheels FL and FR have reached a slippage state where the brake TRC control should be performed. Accordingly, if no need exists to initiate brake TRC control, fulfillment of the initiation condition for brake TRC control is awaited by repeatedly executing the processing of this step 200, and when the initiation condition for brake TRC control is fulfilled, processing progresses to the subsequent step 210.

In step 210, a counter used in termination control which will be described later is reset.

In the subsequent step 220, the SM valves 50FL and 50FR, SR valves 70FL and 70FR, and motor 80 are switched on, and the hydraulic circuit 40 is placed in a state where the driving wheels FL and FR can be braked by brake fluid discharged from the hydraulic pumps 60 and 62.

Accordingly, in the subsequent step 230, known brake TRC control is initiated to control brake-fluid pressure within the W/Cs 2FL and 2FR and in turn braking force applied to the driving wheels FL and FR by controlling the on-off state of the holding valves 46FL and 46FR and pressure-reducing valves 48FL and 48FR in response to the slippage state of the driving wheels FL and FR.

When brake TRC control is initiated in this way, then in step 240 it is determined whether the brake SW 36 has been switched on. If an affirmative determination is made herein, processing to terminate brake TRC control is performed in step 250 and the present processing is stopped once in order to perform normal braking operation. In specific terms, the SM valves 50FL and 50FR, SR valves 70FL and 70FR, motor 80, and holding valves 46FL and 46FR and pressure-reducing valves 48FL and 48FR of the driving wheels FL and FR are all switched off.

Meanwhile, if a negative determination is made in the foregoing step 240, processing advances to step 260 and it is determined whether the termination condition for brake TRC control has been fulfilled.

Accordingly, if it is determined herein that the termination condition for brake TRC control has been fulfilled, processing is transferred to step 270 and termination control is performed as shown in FIGS. 7A through 7J. That is to say, the SM valves 50FL and 50FR and motor 80 continue to remain in an ON state, the SR valves 70FL and 70FR are switched off, and moreover the holding valves 46FL and 46FR and pressure-reducing valves 48FL and 48FR of the driving wheels are changed from a an on-off switching state to an ON state, and termination control is initiated.

In the subsequent step 275, it is determined whether the brake SW 36 is on. If an affirmative determination is made herein, processing advances to step 290 which will be described later and processing to terminate this termination control is performed, whereas if a negative determination is made, processing advances to step 280.

In the subsequent step 280, elapsed time since initiation of termination control is measured by incrementing a counter.

In the subsequent step 285, it is determined according to the counter whether a predetermined time $\Delta t1$ has elapsed since initiation of termination control, and in a case where the predetermined time $\Delta t1$ has elapsed, processing to cause to terminate the foregoing termination control is performed in step 290. That is to say, the SM valves 50FL and 50FR, SR valves 70FL and 70FR, motor 80, and holding valves 46FL and 46FR and pressure-reducing valves 48FL and 48FR of the driving wheels FL and FR are all switched off.

In the subsequent step 300, post-processing is performed, and operation is terminated once.

This post-processing will be described with reference to FIG. 8 and the foregoing FIGS. 7A through 7J.

Figure 8:
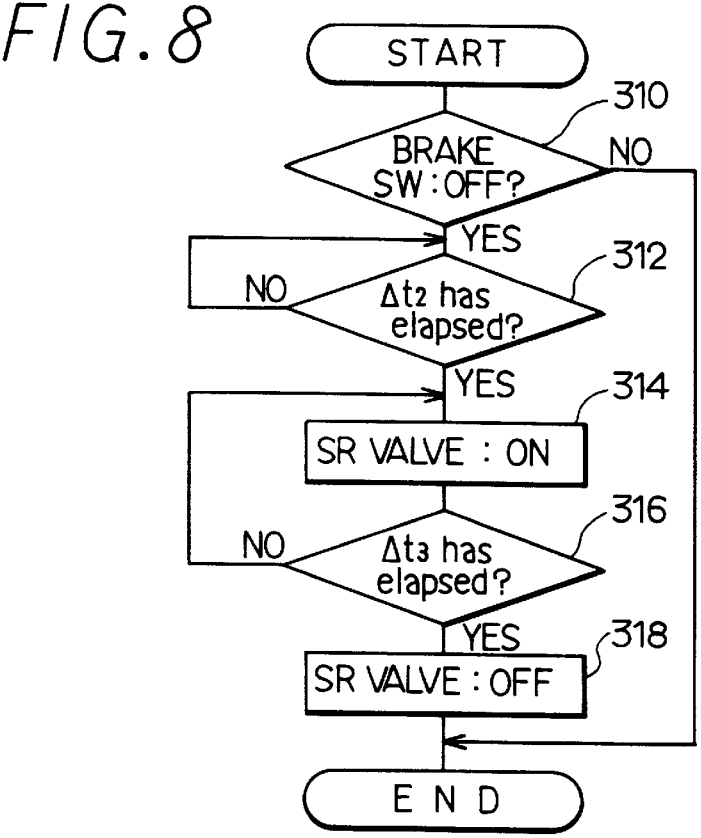
FIG. 8 is a flowchart indicating post-processing of termination control according to the second embodiment.

As shown in FIG. 8, it is determined in step 310 whether the brake SW 36 has been switched off. If an affirmative determination is made herein, processing advances to step 312, whereas if a negative determination is made, processing is terminated once.

In step 312, determination is made whether a predetermined time $\Delta t2$ has elapsed since the brake SW 36 was switched off, and processing advances to step 314 in a case of elapse.

Figure 7:
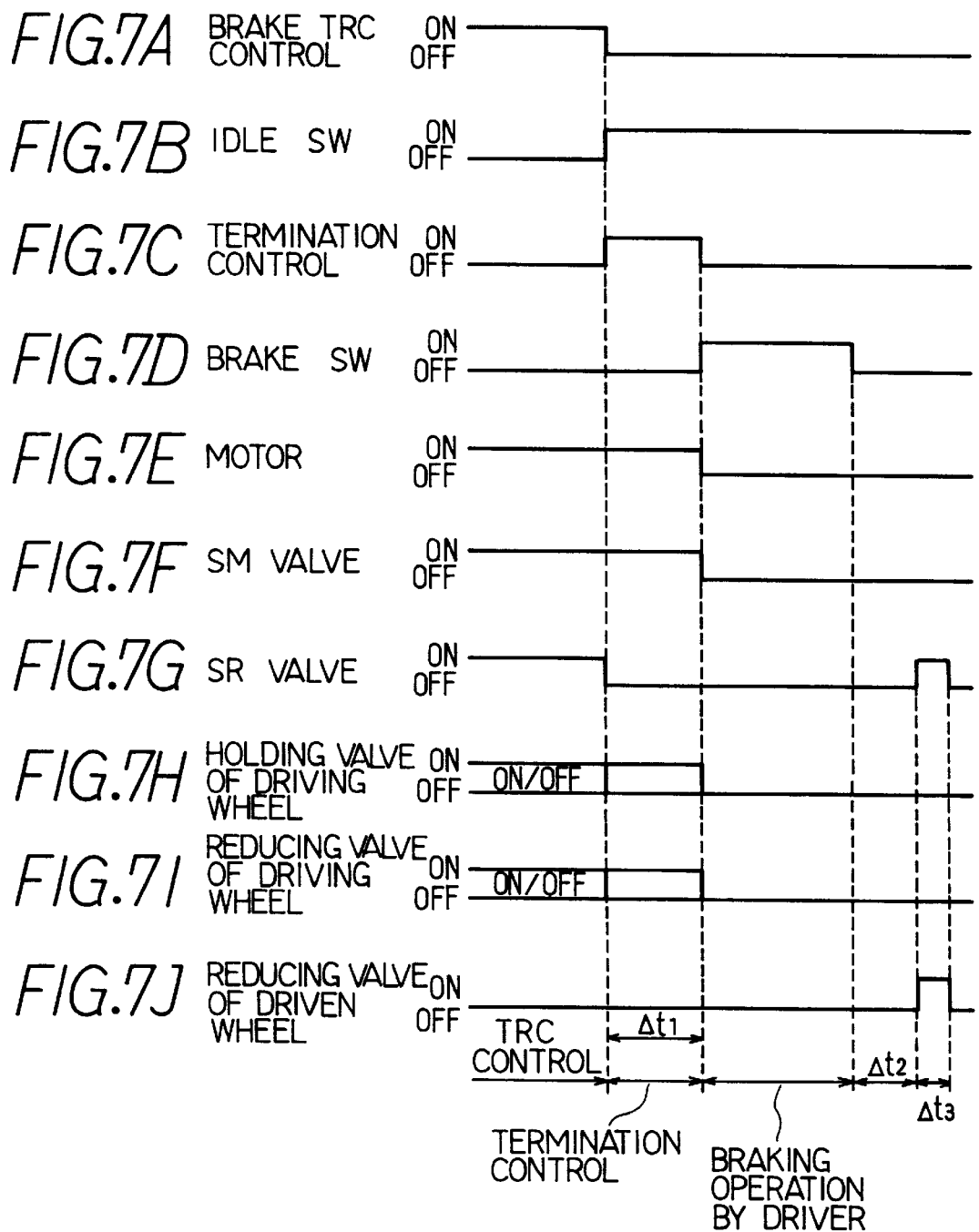
FIGS. 7A through 7J are timing charts indicating processing of termination control according to the first embodiment.

In step 314, as shown in FIG. 7G, the SR valves 70FL and 70FR are switched on. Because of this, processing is performed to allow high-pressure brake fluid remaining on the reservoir 56 and 58 side after the foregoing termination control to escape to the master-cylinder 34 side via the SR valves 70FL and 70FR.

In the subsequent step 316, determination is made whether a predetermined time $\Delta t3$ has elapsed since the SR valves 70FL and 70FR were switched on, and processing advances to step 318 in a case of elapse.

In step 318, the SR valves 70FL and 70FR are switched off and processing is terminated once.

Processing performed in parallel with the post-processing indicated in the foregoing FIG. 8 will be described next with reference to FIG. 9. Additionally, a hydraulic-pressure reduction effect of a certain extent is obtained even when only one of either the processing of FIG. 8 or the processing of FIG. 9 is performed.

Figure 9:
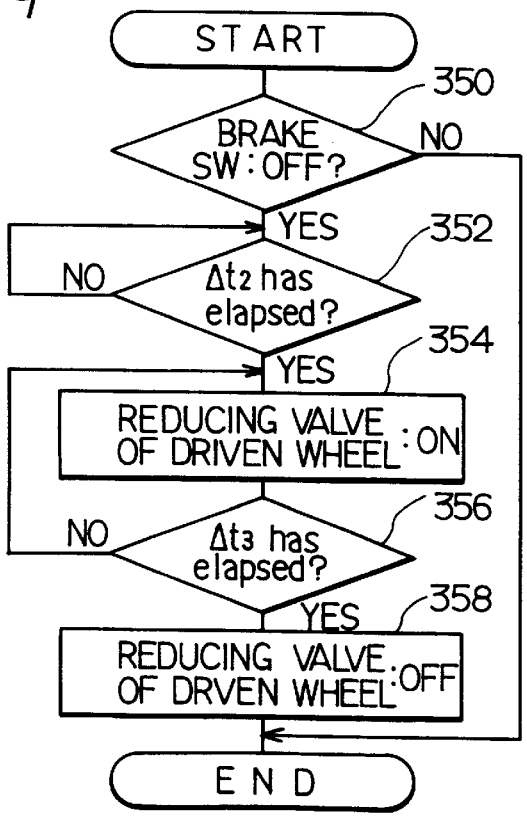
FIG. 9 is a flowchart indicating other post-processing of termination control according to the second embodiment.

As shown in FIG. 9, it is determined in step 350 whether the brake SW 36 has been switched off. If an affirmative determination is made herein, processing advances to step 352, whereas if a negative determination is made, processing is terminated once.

In step 352, determination is made whether a predetermined time $\Delta t2$ has elapsed since the brake SW 36 was switched off, and processing advances to step 354 in a case of elapse.

In step 354, as shown in FIG. 7J, the pressure-reducing valves 48RR and 48RL of the driven wheels are switched on. Because of this, processing is performed to allow high-pressure brake fluid remaining on the reservoir 56 and 58 side after the foregoing termination control to escape to the master-cylinder 34 side via these pressure-reducing valves 48RR and 48RL.

In the subsequent step 356, determination is made whether a predetermined time $\Delta t3$ has elapsed since the pressure-reducing valves 48RR and 48RL of the driven wheels were switched on, and processing advances to step 358 in a case of elapse.

In step 358, the pressure-reducing valves 48RR and 48RL of the driven wheels are switched off and processing is terminated once.

In this way, according to the present embodiment, in a case where brake TRC control has terminated, the SM valves 50FL and 50FR are maintained in an ON state for a predetermined interval $\Delta t1$, and along with this, the holding valves 46FL and 46FR and pressure-reducing valves 48FL and 48FR are respectively switched on for the predetermined interval $\Delta t1$ to establish a reduced-pressure state, and the motor 80 is driven for the predetermined interval $\Delta t1$ in this state. Because of this, high-pressure brake fluid from the W/C 2FL and 2FR can rapidly be reduced, similarly to the above-described first embodiment, and so a state to perform braking operation by normal depression of the brake pedal 32 can quickly be established. Additionally, damage to the M/C 34 can be prevented and moreover oil-shock noise can be alleviated.

According to the present embodiment in particular, the motor 80, SM valves 50FL and 50FR, and holding valves 46FL and 46FR are all switched off and termination control is caused to be terminated in a case where the brake pedal 32 is depressed during execution of termination control (at step 275 and step 290), and so normal braking operation can rapidly be executed.

According to the present embodiment, moreover, the SR valves 70FL and 70FR and pressure-reducing valves 48RR and 48RL of the driven wheels are switched on for a predetermined time $\Delta t3$ after the elapse of the predetermined time $\Delta t2$ since time when braking operation by the driver was terminated. Consequently, there exists an effect wherein residual high-pressure brake fluid can be sufficiently reduced by control in this predetermined time $\Delta t3$ even in a case where pressure reduction of the brake fluid could not be sufficiently performed in termination control.

Furthermore, an FF vehicle was taken as an example according to the present embodiment, but the above-described termination control is also applicable in an FR vehicle which will be described later, wherein only the driving wheels and the driven wheels differ. However, the processing of FIG. 9 is exclusively for an FF vehicle.

In the above embodiment, it was described that the pressure-reducing valves 48RR and 48RL of the driven wheels are switched on for a predetermined time $\Delta t3$ after the elapse of the predetermined time $\Delta t2$ since time when braking operation by the driver was terminated. However, the pressure-reducing valves 48FR and 48FL of the driving wheels can be switched on instead of the pressure-reducing valves 48RR and 48RL, or all the pressure-reducing valves 48FR, 48FL, 48RR and 48RL may be switched on at the same time.

(Third embodiment)

A third embodiment of an automotive brake fluid pressure control apparatus will be described hereinafter.

The present embodiment is an example applying the present invention in a front-engine, rear-drive (FR) four-wheel vehicle, and utilizes a reservoir self-suction and reservoir return form as a hydraulic circuit. Description of areas similar to the during first and second embodiments will be omitted, and only points of difference will be described.

Figure 10:
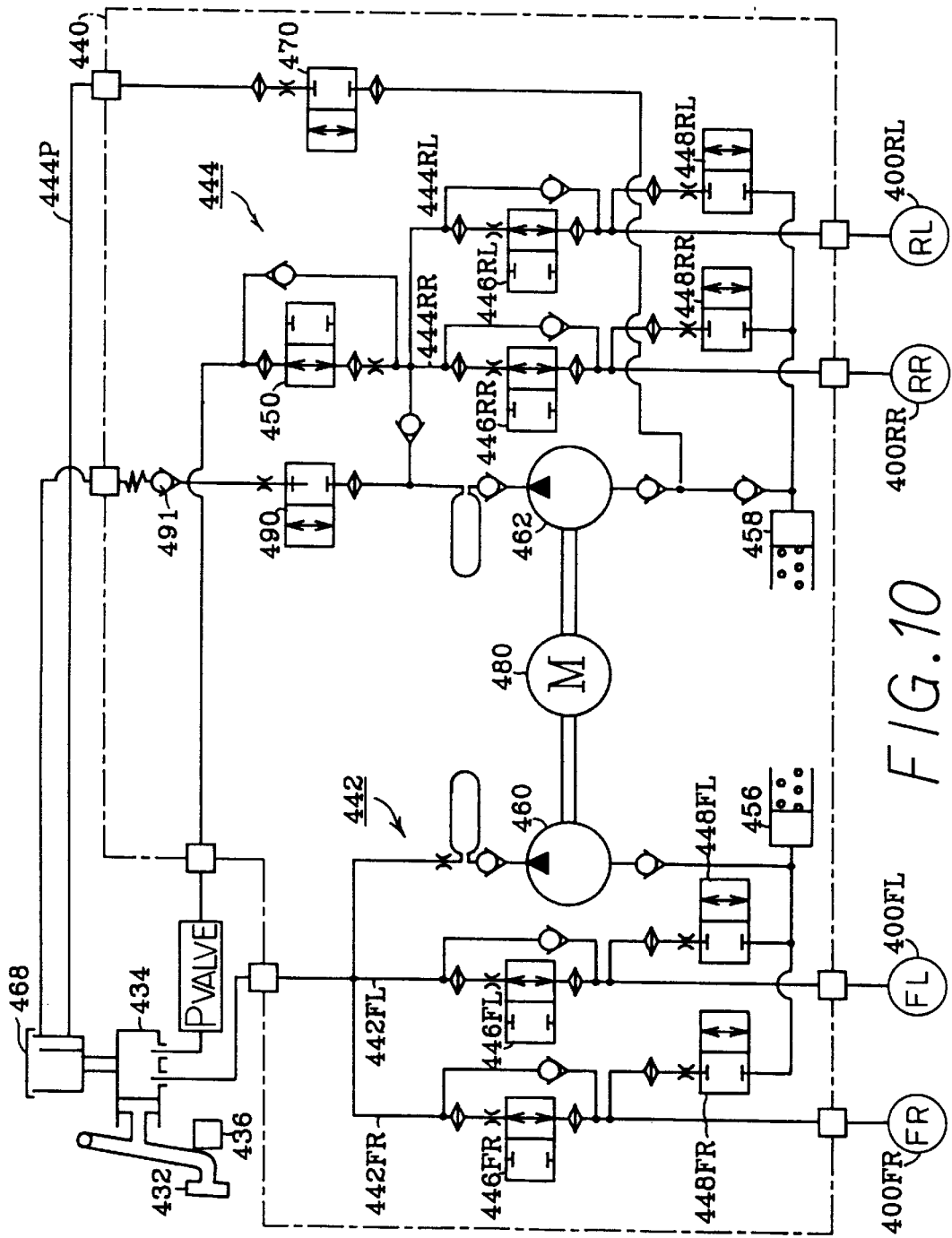
FIG. 10 is an explanatory view indicating a structure of a hydraulic circuit according to a third embodiment.

A hydraulic circuit 440 of the present embodiment is a structure suitable to an FR vehicle and, as shown in FIG. 10, is provided with dual-system hydraulic paths 442 and 444 to supply brake fluid sent under pressure from oil paths of the M/C 434 to the front-left wheel FL and front-right wheel FR and to the rear-right wheel RR and rear-left wheel RL, respectively. Accordingly, of these hydraulic paths 444 and 442, provided in the hydraulic paths 442FL and 442FR reaching the W/Cs 400FL and 400FR of the left and right front wheels which are driven wheels FL and FR are holding valves 446FL and 446FR which are switchable to a pressure-increasing position to be communicated with the paths 442FL and 442FR and to a holding position to interrupt the paths 442FL and 442FR as well as pressure-reducing valves 448FL and 448FR to expel brake fluid within the respective W/Cs 400FL and 400FR.

Meanwhile, of the foregoing respective hydraulic paths 442 and 444, holding valves 446RL and 446RR and pressure-reducing valves 448RL and 448RR are provided in the hydraulic paths 444RL and 444RR reaching the W/Cs 400RL and 400RR of the left and right front wheels which are the driving wheels FL and FR, similarly to the driven wheel side; along with this, an SM valve 450 is disposed at the M/C 434 side of the respective holding valves 446FL and 446FR as the above-described switching valve to communicate and interrupt the path thereof.

Additionally, reservoirs 456 and 458 which temporarily accumulate brake fluid expelled from the pressure-reducing valves 448FL, 448FR, 448RR, and 448RL are provided in the hydraulic paths 442 and 444, hydraulic pumps 460 and 462 to pump up brake fluid from the reservoir 456 and 458 side are also provided, and the two hydraulic pumps 460 and 462 are driven by a motor 480.

Furthermore, an oil-supply path 444P to supply brake fluid directly to the hydraulic pump 462 from a reservoir 468 provided in an upper portion of the M/C 434 during execution of brake TRC control which will be described later is provided in the hydraulic path 444; provided in this oil-supply path 444P is an SR valves 470 to communicate and interrupt the path thereof.

Accordingly, when slippage occurs in the respective wheels FL to RR during vehicle braking, a brake controller not illustrated controls brake-fluid pressure within the respective W/Cs 400FL to 400RR in response to a slippage state of the respective wheels FL to RR by initiating ABS control and respectively switching on or off the holding valves 446FL to 446RR and pressure-reducing valves 448FL to 448RR in the above-described hydraulic circuit 440.

Additionally, when slippage occurs in the driving wheels FL and FR during vehicle acceleration, engine TRC control is initiated to suppress output torque of an internal combustion engine (not illustrated), and along with this, brake TRC control is initiated, the SM valve 450 and SR valve 470 in the hydraulic circuit 440 are switched on, and the holding valves 446RL and 446RR and pressure-reducing valves 44SRL and 448RR are switched on or off, thereby applying braking force to the driving wheels RL and RR and suppressing slippage.

Brake TRC control, which is the primary processing executed by the brake controller, will be described in detail hereinafter with reference to the flowchart shown in FIG. 11 and the timing charts shown in FIGS. 12A through 12H.

Figure 11:
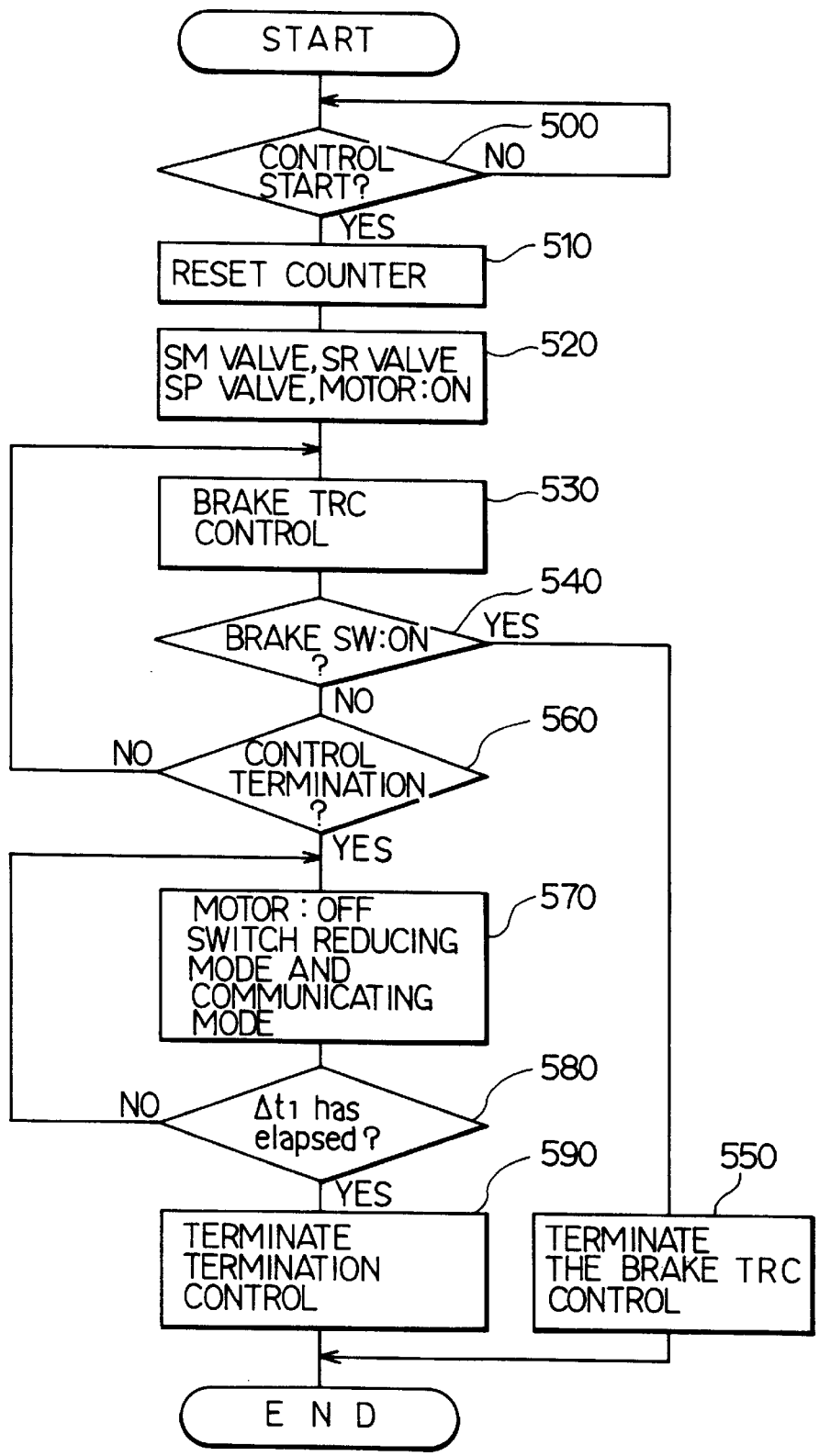
FIG. 11 is a flowchart indicating processing of termination control according to the third embodiment.
Figure 12:
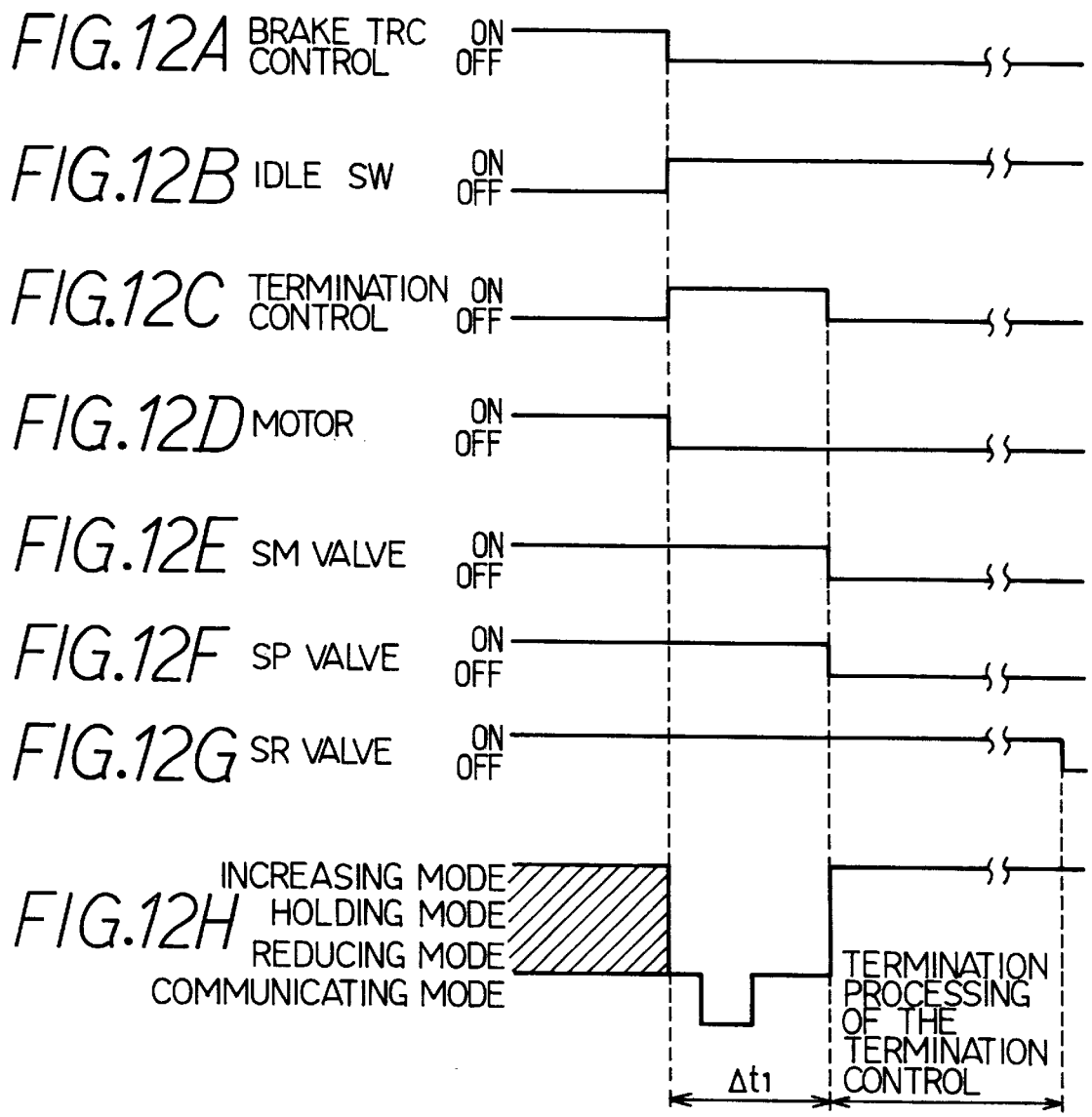
FIGS. 12A through 12H is a timing chart indicating processing of termination control according to the third embodiment.
Figure 13:
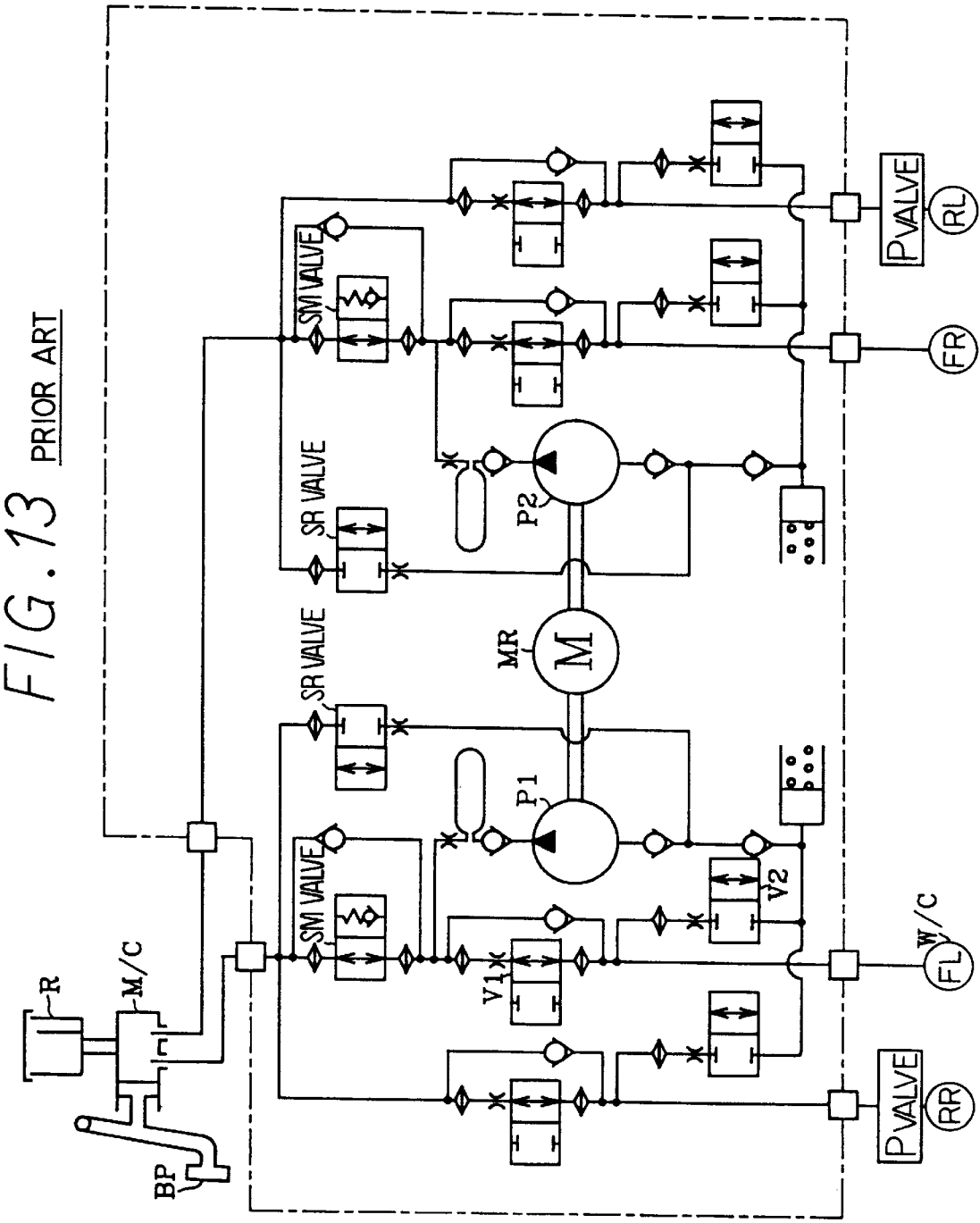
FIG. 13 is an explanatory drawing indicating the prior art.

In brake TRC control processing according to the present embodiment, as shown in FIG. 11, firstly control-initiation determination is performed in step 500 during vehicle acceleration to determine a predetermined condition such as whether the driving wheels RL and RR have reached a slippage state where the brake TRC control should be performed. Accordingly, if no need exists to initiate brake TRC control, fulfillment of the initiation condition for brake TRC control is awaited by repeatedly executing the processing of this step 500, and when the initiation condition for brake TRC control is fulfilled, processing progresses to the subsequent step 510.

In step 510, a counter used in termination control which will be described later is reset.

In the subsequent step 520, the SM valve 450, the SR valve 470, an SP valve 490, and the motor 480 are switched on, and the hydraulic circuit 440 is placed in a state where the driving wheels RL and RR can be braked by brake fluid discharged from the hydraulic pump 462. This SP valve 490 opens and closes an oil path to a pressure-regulating valve 491 disposed in a passage in which brake fluid returns from the hydraulic pump 462 to the reservoir 468, and this SP valve 490 assumes a communicated state when switched on.

Accordingly, in the subsequent step 530, brake TRC control is initiated to control brake-fluid pressure within the W/Cs 400RL and 400RR and in turn braking force applied to the driving wheels RL and RR by controlling the on-off state of the holding valves 446RL and 446RR and pressure-reducing valves 448RL and 448RR in response to the slippage state of the driving wheels RL and RR. That is to say, control to regulate braking force is performed by appropriately switching a mode to control the driving wheels to a pressure-increasing mode which switches off both the holding valves 446RL and 446RR and the pressure-reducing valves 448RL and 448RR, to a holding mode which switches on the holding valves 446RL and 446RR and switches off the pressure-reducing valves 448RL and 448RR, or to a pressure-reducing mode which switches on both the holding valves 446RL and 446RR and the pressure-reducing valves 448RL and 448RR.

When brake TRC control is initiated in this way, then in step 540 it is determined whether a brake pedal 432 has been depressed and a brake SW 436 has been switched on. If an affirmative determination is made herein, processing to terminate brake TRC control is performed in step 550 and the present processing is stopped once in order to perform normal braking operation. In specific terms, the SM valve 450, SR valve 470, motor 480, and holding valves 446RL and 446RR and pressure-reducing valves 448RL and 448RR of the driving wheels RL and RR are all switched off.

Meanwhile, if a negative determination is made in the foregoing step 540, processing advances to step 560 and it is determined whether the termination condition for brake TRC control has been fulfilled.

Accordingly, if it is determined in this step 560 that the termination condition for brake TRC control has been fulfilled, processing is transferred to step 570 and termination control where the pressure-reducing mode and a communicating mode are switched alternately is performed as shown in FIGS. 12A through 12H. That is to say, termination control is performed by switching off the motor 480 and switching in a priorly established predetermined interval, the pressure-reducing mode to reduce brake-fluid pressure within the W/Cs 400RL and 400RR and the communicating mode to suddenly reduce brake-fluid pressure within the W/Cs 400RL and 400RR. In specific terms, for example a first predetermined interval immediately after initiation of termination control is established to be the pressure-reducing mode, a second predetermined interval thereafter is established to be the communicating mode, a third predetermined interval up to termination of termination control thereafter is again established to be the pressure-reducing mode, and thereafter control mode is returns to the pressure-increasing mode. Moreover, an interval established to be a communicating mode may be not just one time, but may be established to be separated into a plurality of times.

The second predetermined interval will be described hereinafter. In a hydraulic circuit provided with a booster valve (a check valve located in parallel with the SM valve 450) whereby hydraulic pressure from the M/C 434 is transmissible to the W/Cs 400RL and 400RR, bypassing the SM valve 450, as in the present embodiment, pedal sagging occurs when the communicating mode is output for a long period during braking operation. This is because the path to the reservoir is established by the communicating mode. In this regard, and in consideration of brake SW failure as well, it is preferred that the second predetermined interval be set to from several milliseconds to several tens of milliseconds by which oil-shock noise is solved and moreover brake sagging does not occur. However, if the booster valve is not provided with, the second predetermined interval is not limited as described above.

In the subsequent step 580, it is determined according to the counter whether a predetermined time Δt1 has elapsed since initiation of termination control, and in a case where the predetermined time Δt1 has elapsed, processing to cause to terminate the foregoing termination control is performed in step 590. That is to say, the SM valve 450 and SP valve 490 are switched off and the pressure-increasing mode is established. Furthermore, the SR valve 470 is also switched off after elapse of the predetermined interval to further reduce hydraulic pressure.

In this way, according to the present embodiment, the pressure-reducing mode is temporarily switched to the communicating mode in termination control performed after brake TRC control has terminated. Consequently, there exist advantages in that high-pressure brake fluid is released to a large-capacity W/Cs 400RL and 400RR and reservoir 458 low-pressure side and momentarily reduced in pressure in this communicating mode, and moreover the pressure-reducing time thereof is extremely short, and oil-shock noise is alleviated.

Furthermore, the present invention is in no way exclusively limited to the above-described embodiments, but can be embodied in a various way within a scope which does not depart from the essence of the present invention.

What is claimed is:

1. An automotive brake fluid pressure control apparatus to apply brake-fluid pressure to a wheel cylinder of a vehicle wheel and control motion characteristics of a vehicle even at a time other than braking operation by a driver, comprising:

a pump to discharge high-pressure brake fluid to a conduit connecting a master cylinder and said wheel cylinder;

a first switching valve, disposed in a conduit connecting a master cylinder side and an intake side of said pump, which is switchable to a communicated position and to an interrupted position;

a second switching valve, disposed in a conduit connecting a supply side of brake fluid caused to be high in pressure by said pump and said master cylinder side, which is switchable to a first communicated position and to a second position permitting fluid flow from said supply side of brake fluid to said master cylinder side;

a pressure-control valve to control supply and discharge of brake fluid to and from said wheel cylinder of said vehicle wheel;

a discharge conduit to induct brake fluid expelled from said wheel cylinder by said pressure-control valve to said intake side of said pump;

vehicle motion characteristics controlling means for controlling said motion characteristics of said vehicle by adjusting brake-fluid pressure applied to said wheel cylinder, an adjustment of brake-fluid pressure being performed by operations of said first switching valve, said second switching valve, said pump, and said pressure control valve; and termination controlling means for placing said first switching valve at said interrupted position and placing said second switching valve at said second position, driving said pressure-control valve to a state in which brake fluid is expelled from said wheel cylinder to said intake side of said pump through said discharge conduit, and moreover driving said pump so that brake fluid in a wheel cylinder side is returned to said master cylinder side, at a time of termination of control of motion characteristics of said vehicle by said vehicle motion characteristics controlling means.

2. An automotive brake fluid pressure control apparatus according to claim 1, wherein said vehicle motion characteristics controlling means includes acceleration slippage detecting means for detecting occurrence of acceleration slippage in said vehicle wheel and brake-fluid pressure applying means for applying brake-fluid pressure to said wheel cylinder of said vehicle wheel in a case where acceleration slippage has been detected by said acceleration slippage detecting means.

3. An automotive brake fluid pressure control apparatus according to claim 1, wherein:

said control of motion characteristics of said vehicle is antiskid control and traction control, and said termination controlling means is driven at a time of termination of said traction control.

4. An automotive brake fluid pressure control apparatus according to claim 1, further comprising:

a pressure-regulating valve which, when pressure of brake fluid discharged by said pump has exceeded a predetermined pressure, expels brake fluid thereof to said master-cylinder side.

5. An automotive brake fluid pressure control apparatus according to claim 4, wherein:

said pressure-regulating valve expels brake fluid from a discharge side of said pump to a conduit connected to said master cylinder.

6. An automotive brake fluid pressure control apparatus according to claim 1, wherein:

said pump takes in brake fluid via said master cylinder from a reservoir of said master cylinder.

7. An automotive brake fluid pressure control apparatus according to claim 1, further comprising:

braking determining means for determining whether braking operation by a driver has been performed; and braking controlling means for terminating control by said termination controlling means to cause said pump to be stopped, placing said first switching valve at said interrupted position and placing said second switching valve at said communicated position, and moreover driving said pressure-control valve to a state which supplies brake fluid to said wheel cylinder, in a case where performance of braking by said driver has been determined by said braking determining means.

8. An automotive brake fluid pressure control apparatus according to claim 7, further comprising:

braking termination determining means for determining whether braking operation by said driver has been terminated; and discharge controlling means for driving said first switching valve to said communicated state for a predetermined interval and expelling brake fluid from a reservoir of said wheel-cylinder side to said master-cylinder side in a case where termination of braking operation by said driver has been determined by said braking termination determining means.

9. An automotive brake fluid pressure control apparatus according to claim 7, further comprising:

braking termination determining means for determining whether braking operation by said driver has been terminated; and discharge controlling means for driving for a predetermined interval said pressure-control valve disposed in a conduit connecting from said master-cylinder side to a reservoir of said wheel-cylinder side in a communicated state and expelling brake fluid from said reservoir of said wheel-cylinder side to said master-cylinder side in a case where termination of braking operation by said driver has been determined by said braking termination determining means.

* * * * *